United States Patent

Harris

[15] 3,693,059

[45] Sept. 19, 1972

[54] CAPACITIVE COUPLING SWITCH AND ACTUATOR

[72] Inventor: Richard H. Harris, Raleigh, N.C.

[73] Assignee: International Business Machines Corporation, Armonk, N.Y.

[22] Filed: June 17, 1971

[21] Appl. No.: 154,112

[52] U.S. Cl. ..........................317/249 R, 200/DIG. 1

[51] Int. Cl. ..............................................H01g 5/01

[58] Field of Search .......317/246, 249 R; 200/159 A, 200/DIG. 1

[56] References Cited

UNITED STATES PATENTS

| | | | |
|---|---|---|---|
| 1,665,616 | 4/1928 | Trump | 317/249 R |
| 1,871,048 | 8/1932 | Dublier | 317/249 R |
| 2,036,084 | 3/1936 | Roder | 317/249 R |
| 2,109,184 | 2/1938 | Sereda | 200/159 A |
| 3,548,138 | 12/1970 | Van Dine | 200/159 A |
| 3,293,640 | 12/1966 | Chalfin | 317/246 X |

*Primary Examiner*—E. A. Goldberg
*Attorney*—Edward H. Duffield et al.

[57] ABSTRACT

A variable capacitance switch element is disclosed in which varying capacitance is effected by increasing the active surface area of a capacitive coupling member in proximity to a second capacitive plate. The structure of the variable capacitive element is such that the capacitance of the device varies in nearly linear fashion with the depression of an actuator member.

3 Claims, 3 Drawing Figures

Figure 1:
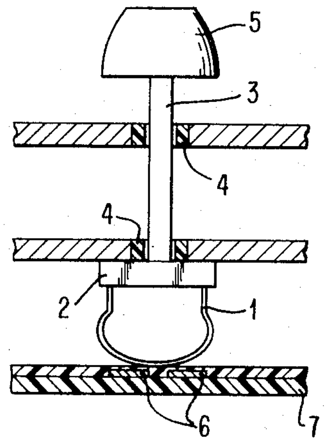

INVENTOR
RICHARD H. HARRIS
BY Edward H. Duffield
AGENT

CAPACITIVE COUPLING SWITCH AND ACTUATOR

BACKGROUND

1. Field of the Invention

This invention relates to capacitive couplings in general and to capacitive switching keyboard devices in particular.

2. Prior Art

The need for physical key hysteresis is well known as a keyboard switch design criterion. The term "physical key hysteresis" as used herein, means that if a switch is actuated at a certain position in the travel of the switch actuator mechanism, the actuator mechanism should be returned for some distance before deactuation of the switch takes place. As a practical matter, this hysteresis, the distance required to turn the switch off after it has been turned on, should be in the neighborhood of 0.01 to 0.06 inches to be useful. In the past, it has been quite difficult to achieve this large amount of hysteresis in the structures utilized in capacitive sensing keyboards and key switches. These devices generally utilize co-planar capacitor plates which are covered with a thin film dielectric. The capacitor plates are usually located in opposition to a vertically movable capacitive coupling plate which is affixed to a movable key stem or actuator. This coupling plate is usually rigid, flat and oriented parallel to and above the pair of co-planar capacitance plates. The capacitance is varied in these previous designs by moving the actuator or key stem to close the air gap between the coupling plate and the cooperating pair of co-planar capacitor plates. In this type of design, the capacitance varies only slightly at first and then rises quite sharply as the gap closes from 0.007 inches until the time when the movable plate contacts the dielectric covering over the co-planar plates. This type of varying capacitance is typified by an exponential rise in the capacitance effect which is concentrated over the final 0.007 inches of key travel. The exponential rise of the capacitance makes provision of a significant physical hysteresis extremely difficult or impossible in conventional designs—that is, the difference in capacitance values which are sensed as an "on" and "off" condition occur very close together in the key travel. Also, the presence of slight surface irregularities in the coupling members or the presence of dirt or other foreign matter so changes the capacitance that reproducible actuation is very difficult to achieve. While mechanical means for providing physical hysteresis have been successful in the past, and devices for overcoming the effects of surface irregularities and dirt have been developed, the devices so produced are generally complicated in structure with an increased number of parts, are difficult to assemble and are costly to service. In particular, to overcome capacitive variance due to surface irregularities and dirt, it has been necessary to produce very flat coupling surfaces and then isolate these surfaces from dust and dirt. Both of these necessary precautions are expensive and make such devices less desirable.

Another key switch or keyboard design requirement is that the actuator should have "overtravel;" i.e., it should be movable beyond the "on" or initial sensing point in the actuator travel so that the operator who actuates the key may receive an informative signal external to the keyboard that the actuator has been moved sufficiently to provide good electrical actuation. In the prior art, where the coupling plate is usually rigidly affixed to the actuator or key stem, less than 0.005 inches of overtravel can be provided. When this amount of overtravel is compared with the deflection required to move the coupling plate between the two relative sensing positions, only about 0.007 inches of travel, it can be seen that such limited overtravel, as provided by the prior art, is quite insignificant and renders the switch highly sensitive to minute deflections of the actuator and hence to erroneous key actuation by vibrations, etc. In general, the solution to this problem in the past has been to use a collapsible key stem, such as an axially compressibly spring member, or some other resilient force-deflection input member. But this requires additional parts and expense both in manufacture and in maintenance of the device.

OBJECTS

In view of the foregoing and other problems in the prior art, it is an object of this invention to achieve an almost linear capacitance variation in response to actuator or key stem displacement so that the "on" and "off" sensing positions or capacitance values will be separated from one another over a relatively large distance so that good physical key hysteresis is produced in an improved way.

It is another object of this invention to allow significant amounts of overtravel of the actuator member beyond the point necessary to actuate the switch in an improved way so that good "key feel" is imparted to the operator.

Additionally, it is an object of this invention to make an improved capacitive switch in which the undesired effects of surface irregularities or dirt on the capacitive coupling plates are overcome in an improved manner.

Still another object of this invention is to simplify and improve the structure by reducing the number of active parts and by increasing the number of functions served by some parts in order to achieve an overall improved switch.

SUMMARY

This invention satisfies the foregoing objects and solves the above mentioned problems by utilizing a deformable or conformable, resilient, generally bowed or U-shaped spring member as both a capacitive coupling plate member which conforms to the surface irregularities of the coupling members which it couples, and as a key restoring bias means. In this invention, the U-shaped spring is mounted on the end of a key stem or actuator which is vertically movable in relationship to two co-planar, dielectrically insulated capacitive plates. When the operator displaces the key stem, the U-shaped is brought into increased contact with the dielectric layer overlying the capacitive plates. As additional force is applied to the key stem, the U-spring flattens out and conforms to the surface of the dielectric over the capacitive plates, thereby increasing capacitance in a nearly linear fashion and also increasing the amount of force required to displace the key further as a function of key travel. To prevent erroneous keying, the key is given an initial preload by displacing the key permanently by a few hundredths of an inch, thereby creating an initial spring force which must be overcome before the key is moved further.

The above objects and other objects, features and advantages of the invention will be apparent from the following more particular description of a preferred embodiment of the invention, as illustrated in the accompanying drawings.

DRAWINGS

One embodiment of the invention is shown in

FIG. 1 which illustrates a typical U-spring attached to a key stem actuator which is movable to force the U-spring into cooperation with the associated capacitive dielectrically insulated members.

Figure 2:
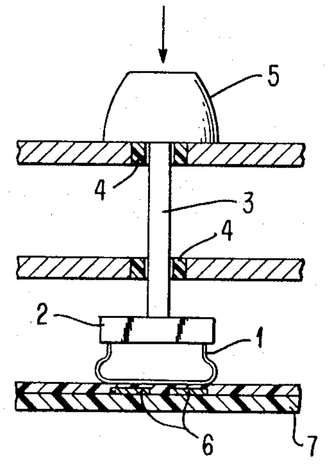

FIG. 2 illustrates the embodiment of FIG. 1 as it would appear if the key stem were pushed to its maximum deflection and illustrates how the U-spring flattens out to increase the capacitive coupling between it and the capacitive pads.

Figure 3:
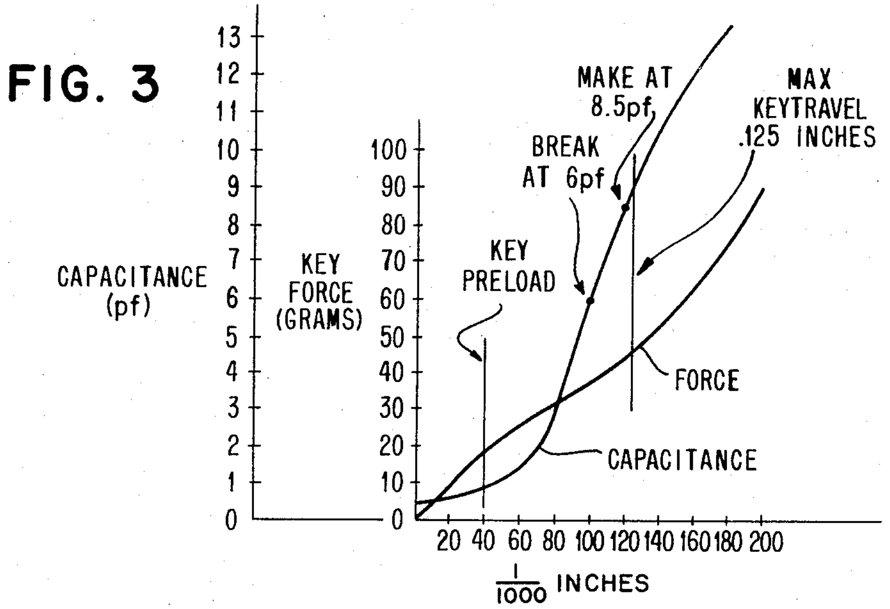

FIG. 3 graphically illustrates a typical example of how capacitance and force vary in a nearly linear fashion with increasing deflection of the actuator.

In the embodiment shown in FIG 1, bowed or U-shaped spring means 1 is shown mounted on a suitable mounting bracket 2 which is positioned on the end of a key stem or actuator 3, which is movably disposed in guides 4 and driven by a force applied through key button 5, to force U-spring 1 into proximity with dielectrically covered capacitive pads 6 mounted on substrate 7.

As shown, the guides 4 are sleeve bearings positioned axially along the key stem 3. Any suitable guides could be provided, their only function being to slidably retain the key stem assembly in an upright position. Similarly, while the force to the key stem or actuator is shown as applied through a key button, many other suitable types of force application means could be utilized; such as a pivoted lever, cam or other commonly known means.

It will be noted that mounting member 2 serves a dual purpose in that it not only serves as a holder for the U-spring member 1, but it also serves as a stop to prevent outward travel of the key stem 3 beyond a given point at which mounting member 2 contacts lower guide member 4. However, many other suitable stops exist and mounting means 2 need not serve this function. As shown in FIG. 1, U-spring 1 touches the dielectric layer over capacitive pads 6 when the key is in its unactuated position. This is to provide a certain amount of preload and an initial capacitance from which to gauge changes in capacitance. Typically, the key is displaced 0.04 inches and is maintained in that position by the lower guide in cooperation with mounting means 2 which gives approximately 19 grams of key preload and approximately 0.9 picofarads 32 of capacitance. As shown in FIG. 3, this preload also brings the starting capacitance and key force into the general range of approximately linear variance as a function of increasing key deflection. Key travel is accompanied by the requirement of additional key force. Added key travel produces an almost linear increase in capacitance as shown in FIG. 3. The linear nature of the capacitance variation is the result of the fact that the coupling area, in contra-distinction to the air gap utilized in the prior art, is increased as the key is depressed instead of having the gap decrease as the key is depressed. By adjusting the relative sizes of the coupling elements or by tapering the U-spring member, an extremely fine linearity in capacitance variation could be achieved. However, for the present purposes, this is not necessary as the structure shown provides sufficient linearity for use as a switch. A typical sensing circuit, not of any particular importance to this invention, can be connected to one of the conductive pads 6 and can be built to turn "on" at 8.5 picofarads at approximately 0.08 inches of travel beyond the initial 0.04 inches of preload and to turn "off" at 6.0 picofarads and only 0.06 inches of key travel beyond the initial preload distance. This configuration provides 0.02 inches of physical hysteresis for the electronic switch and this falls within the range of hysteresis which has practical significance in the art.

If total downward key travel in this configuration is limited to 0.125 inches, it can be seen that after the 0.08 inches of key travel necessary to turn on the switch, an additional 0.045 inches of overtravel are provided within the 0.125 inches of total travel.

STATEMENT OF OPERATION

The mode of operation of the embodiment shown in FIG. 1 can be visualized by studying FIGS. 1 and 2. Initially, as shown in FIG. 1, the bowed portion of the U-spring 1 is held in a partially deflected position which gives a certain preload to key stem 3 and which results in a certain amount of initial capacitance between U-spring 1 and capacitive coupling pads 6 as previously described. If it is now desired to turn "on" an electronic switch, it is necessary to depress the key stem. This will require the application of force greater than the initial preload force before movement of the key stem will result.

As shown in FIG. 2, upon depression of the keybutton, the bowed portion of the U-shaped spring, which may also be O-shaped or other similar curvilinear shape of general bowed profile, is driven into greater contact with the dielectric insulation overlying the capacitive coupling pads 6 and gradually flattens into an increased area of tight, flat contact which increases the capacitance of the assembly as measured between the bowed spring means and the capacitive coupling pads or between the pads themselves through the U-spring. The increased capacitance between the capacitive pads may be sensed by an electrical signal line (not shown for the sake of clarity) connected to one of the pads. An input signal to be sensed can be applied to the other capacitive pad via an electrically conductive line (also not shown). The "on" threshold of the sensing circuit device is set higher than the "off" threshold to provide an electrical hysteresis in the output signal. The physical key hysteresis previously described is necessary to provide adequate separation in the key travel between the "on" and the "off" thresholds sensed to provide some minimum definite key travel to turn "on" and to overcome electrical noise due to vibration (of less than 0.02 inches) of the coupling members by external forces, and disturbances in the key displacement.

ADVANTAGES

This invention, by the utilization of the unitary, conformable spring capacitance member and key restoring means, provides economical means of obtaining tight flatness between a movable coupling plate and the capacitor coupling pads because bending loads in the bowed spring member cause it to conform to the subtle flatness variations on the surface of the dielectric.

Similarly, this design is exceedingly simple and easy to construct and it requires virtually no maintenance.

In addition, the compactness of the mechanism which this type of structure exemplifies, makes possible the construction of extremely low profile keyboard assemblies which is of great advantage in today's modern design for keyboards.

While this invention has been particularly shown and described with reference to a preferred embodiment thereof, it will be understood by those skilled in the art that various changes in form and detail may be made therein without departing from the spirit and scope of the invention.

What is claimed is:

1. In a capacitive key switch mechanism having a key actuator, dielectrically insulated conductive members and a movably mounted capacitive coupling member for capacitively coupling said conductive members, the improvement comprising:

said capacitive coupling member being a resilient conformable bowed spring means which flattens, upon being moved by said key actuator into contact with said dielectrically insulated conductive members, into a capacitive coupling relationship with said members to produce nearly linear capacitance and key force variation in response to movement of said movably mounted capacitive coupling member, said resilient coupling member further providing, by its resilience, a restoring force to return said key actuator to its unactuated position on the release of force thereon.

2. A capacitive key switch device as described in claim 1, wherein said movably capacitive coupling member has an O-shaped profile in a plane perpendicular to the place occupied by said dielectrically insulated conductive member and is mounted for reciprocation in said vertical plane by a movable mounting means.

3. A capacitive key switch device as described in claim 1, wherein said movably capacitive coupling member has a U-shaped profile in a plane perpendicular to the plane occupied by said dielectrically insulated conductive member and is mounted for reciprocation in said vertical plane by a movable mounting means.

* * * * *